B. C. SMALL.
CORN HUSKING AND HARVESTING MACHINE.
APPLICATION FILED JULY 27, 1909.

1,160,777.

Patented Nov. 16, 1915.
9 SHEETS—SHEET 3.

B. C. SMALL.
CORN HUSKING AND HARVESTING MACHINE.
APPLICATION FILED JULY 27, 1909.

1,160,777.

Patented Nov. 16, 1915.
9 SHEETS—SHEET 6.

B. C. SMALL.
CORN HUSKING AND HARVESTING MACHINE.
APPLICATION FILED JULY 27, 1909.

1,160,777.

Patented Nov. 16, 1915.
9 SHEETS—SHEET 7.

Witnesses:

Inventor:
Byron C. Small
by Buckley Durand & Drury
attys

B. C. SMALL.
CORN HUSKING AND HARVESTING MACHINE.
APPLICATION FILED JULY 27, 1909.

1,160,777.

Patented Nov. 16, 1915.
9 SHEETS—SHEET 8.

UNITED STATES PATENT OFFICE.

BYRON C. SMALL, OF CENTRALIA, ILLINOIS.

CORN HUSKING AND HARVESTING MACHINE.

1,160,777.  Specification of Letters Patent.  Patented Nov. 16, 1915.

Application filed July 27, 1909. Serial No. 509,865.

*To all whom it may concern:*

Be it known that I, BYRON C. SMALL, a citizen of the United States of America, and resident of Centralia, Illinois, have invented a certain new and useful Improvement in Corn Husking and Harvesting Machines, of which the following is a specification.

My invention relates to improvements in corn harvesting and husking machines, and has for its object the production of a machine in which two rows of corn may be operated upon at the same time in an efficient manner.

A further object is the production of a machine in which the guiding is done from the front but the machine as a whole is pushed from behind.

A further object is the production of improved mechanisms and adjustments therefor by means of which a maximum of efficiency is attained by my machine.

These and such other objects as may hereinafter appear are attained by my device, embodiments of which are illustrated in the accompanying drawings, in which—

Fig. 5 is an enlarged section on line 5—5 of Fig. 1, looking in the direction indicated by the arrows, illustrating a right and left hand driving mechanism and conveyers comprising a two-row corn picker. Fig. 14 is a diagrammatic view of the corn stalk feed and manner of displacing the ear.

Like letters of reference indicate like parts in the several figures of the drawings.

Figure 6:
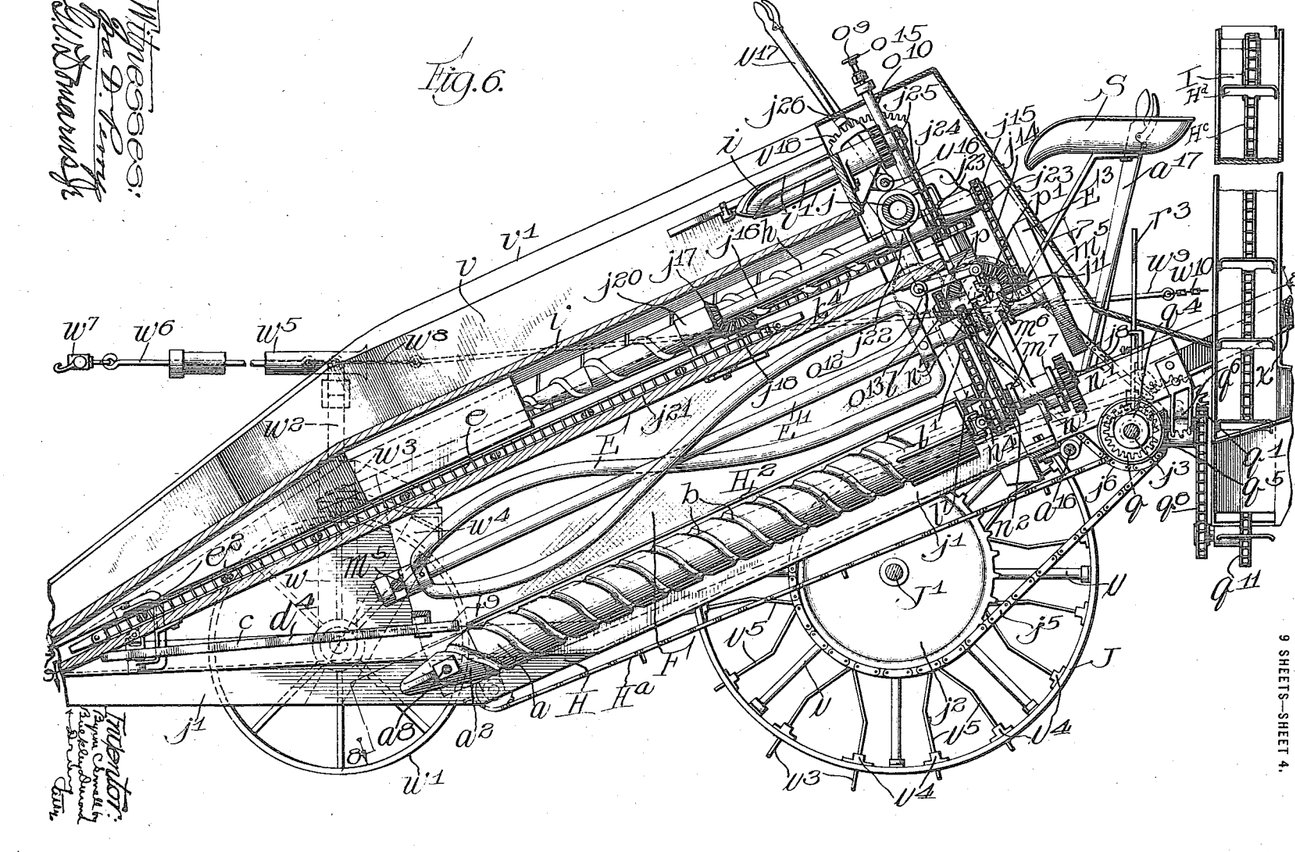
Fig. 6 is a section on the line 6—6 of Fig. 5, looking in the direction indicated by the arrows, and illustrating the corn stalk feed and beater bar and the delivery conveyer.

Referring to Fig. 6, the feed rolls $a$ and $a^1$ are placed with the lower tapering ends $a^2$ nearest the ground so as to engage the lowest possible corn stalk.

Figure 8:
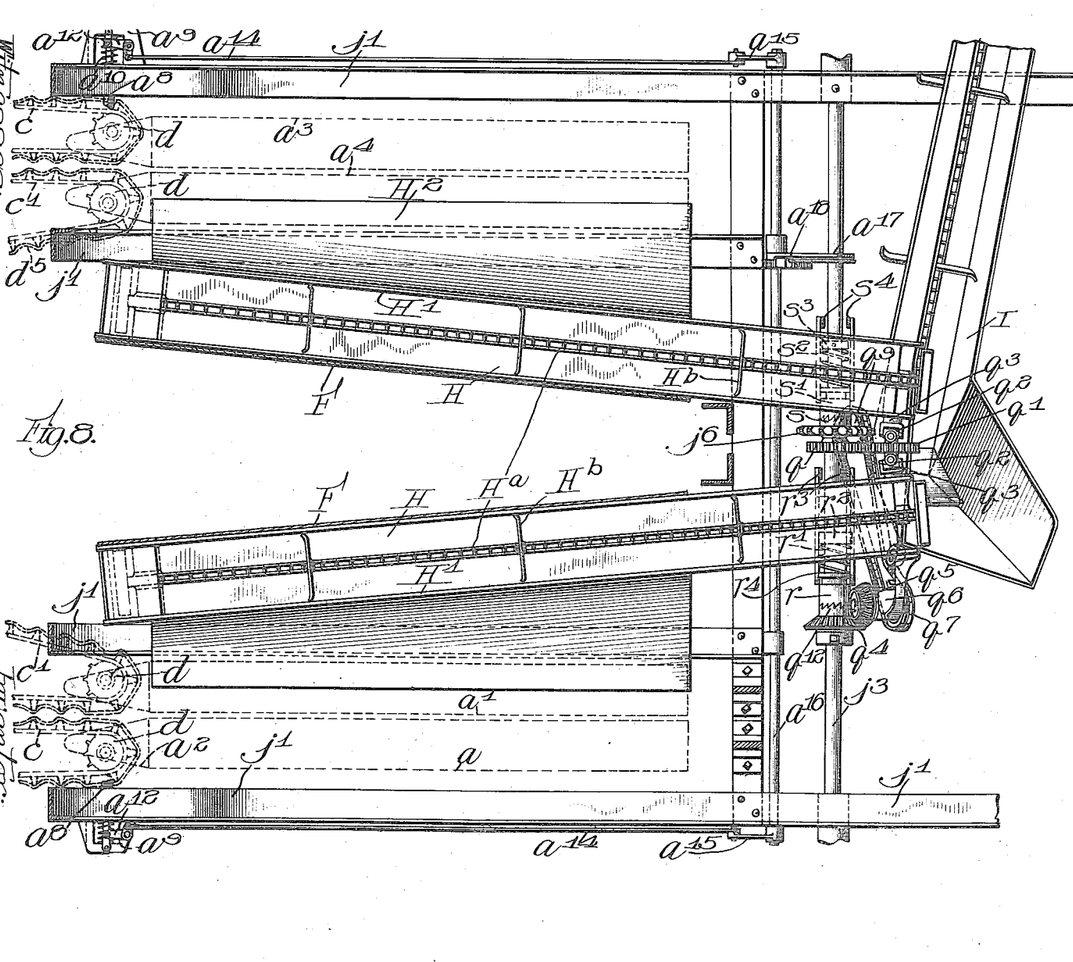
Fig. 8 is a section on line 8—8 of Fig. 6, looking in the direction indicated by the arrows, showing the feed rolls and flexible feed roll belt in dotted lines.

By referring to Figs. 8 and 14, it will be seen that there is a pair of feeding rolls $a^3$ and $a^4$ whose function and operation are identical with the rolls $a$ and $a^1$, thus forming what is known as a two-row corn picker, each pair of rolls engaging its own row of corn.

Figure 9:
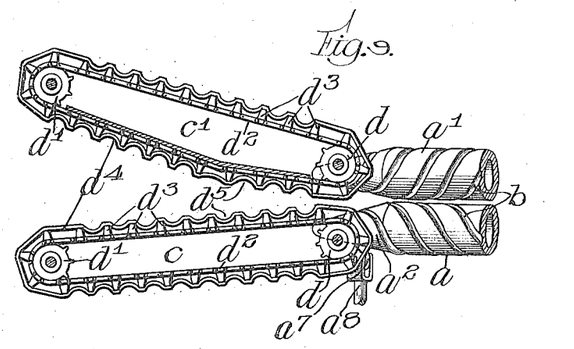
Fig. 9 is a sectional view on line 9—9 of Fig. 6, looking in the direction indicated by the arrows, and illustrates a pair of feeding rolls and feeding roll belts.

Running longitudinally of the rolls $a$, $a^1$, $a^3$ and $a^4$ is a spiral groove $b$, which has a tendency to feed the stalk of corn ahead, as the edges of the groove grip the body of the stalk. Mounted above the tapering portion $a^2$ of the feed rolls $a$ and $a^1$ are the short flexible feed belts $c$ and $c^1$, best shown in Fig. 9, and in dotted lines in Fig. 8. Running around the ordinary sprocket wheels $d$ and $d^1$ is the sprocket chain $d^2$ having lugs or projections $d^3$ to which is fastened the flexible member or belt $d^4$. It will be seen that the feed belts $c$ and $c^1$ are offset at their front or end at which the corn enters, to give a free and easy opening for the same. It can be readily seen that after the flexible belt member $d^4$ passes around the outer sprocket wheel $d^1$ it forms pockets or depressions $d^5$ into which the stalk of corn is gripped and fed toward the spiral feed rolls $a$ and $a^1$, at which point the projections on the sprocket chain separate farther at their ends, thus straightening the flexible member and disengaging it from the stalks. Secured to the shaft or spindle of the sprockets $d^1$ are the sprocket wheels $f$ and $f^1$ over which pass the overhead or holding feed chains $e$ and $e^1$. The feed chain $e$ is provided with hooks or fingers $e^2$ adapted to engage the stalks and prevent them from falling back, and also feeding the stalks forward. It will be seen that the chain $e$ is offset at its front end by passing over the guard or runway $e^3$ to insure a positive entry of stalk, and at its rear end to insure the proper release. The feed chain $e^1$ is provided with hooks or fingers $e^4$ adapted to engage the stalk and carry it forward until it is engaged by the spring shields or blades $g$ mounted on the rod or shaft $g^1$ which is securely fastened to the frame. The short feed chain $e^1$ is offset at its rear end at the point that the stalk leaves it and engages the spring shields, the purpose of the shields being to support the stalk while it is being fed forward by the feed chain $e$.

As seen in Figs. 6 and 14, the lower end of the stalk is held in position by the feed rolls $a$ and $a^1$ and carried above by the feed chains $e$ and $e^1$ until the corn-bearing portion is carried in the path of the revolving spiral-shaped beater or knocker-bar E, where the ear of corn is knocked from the husk and thrown against the canvas guard F, which is fastened at one end upon the running board G upon which the chain $e^1$ travels, and on its lower end to the trough or conveyer H, as illustrated in Fig. 8. The conveyer H consists of the ordinary chain $H^a$ and conveyer blades $H^b$. As the corn enters the conveyers H it is fed to the rear of the machine to the feed or delivery conveyer I running transversely of the machine, and is here conveyed to any suitable means of delivery. Fastened to the trough $H^1$ of the conveyer H and extending to the feed rolls $a^1$ and $a^4$ is the flat covering $H^2$ to prevent the corn from falling to the ground Referring to Figs. 6 and 7, it will be seen that as the stalk leaves the feed chain $e$ it is picked up or carried on farther by the supplemental feed roller $h$ having spiral shaped projections or corrugations $h^1$ which have a tendency to carry and hold the stalks in their relative positions between the spring shields and the feeding rolls. Placed above and running parallel to the corrugated roll $h^1$ are the short withdrawing rolls $i$ having longitudinal corrugations $i^1$ which are arranged so as to catch any short pieces of stalk broken from the top, and draw them up out of the machine to prevent clogging, as illustrated in Fig. 14.

Figure 5:
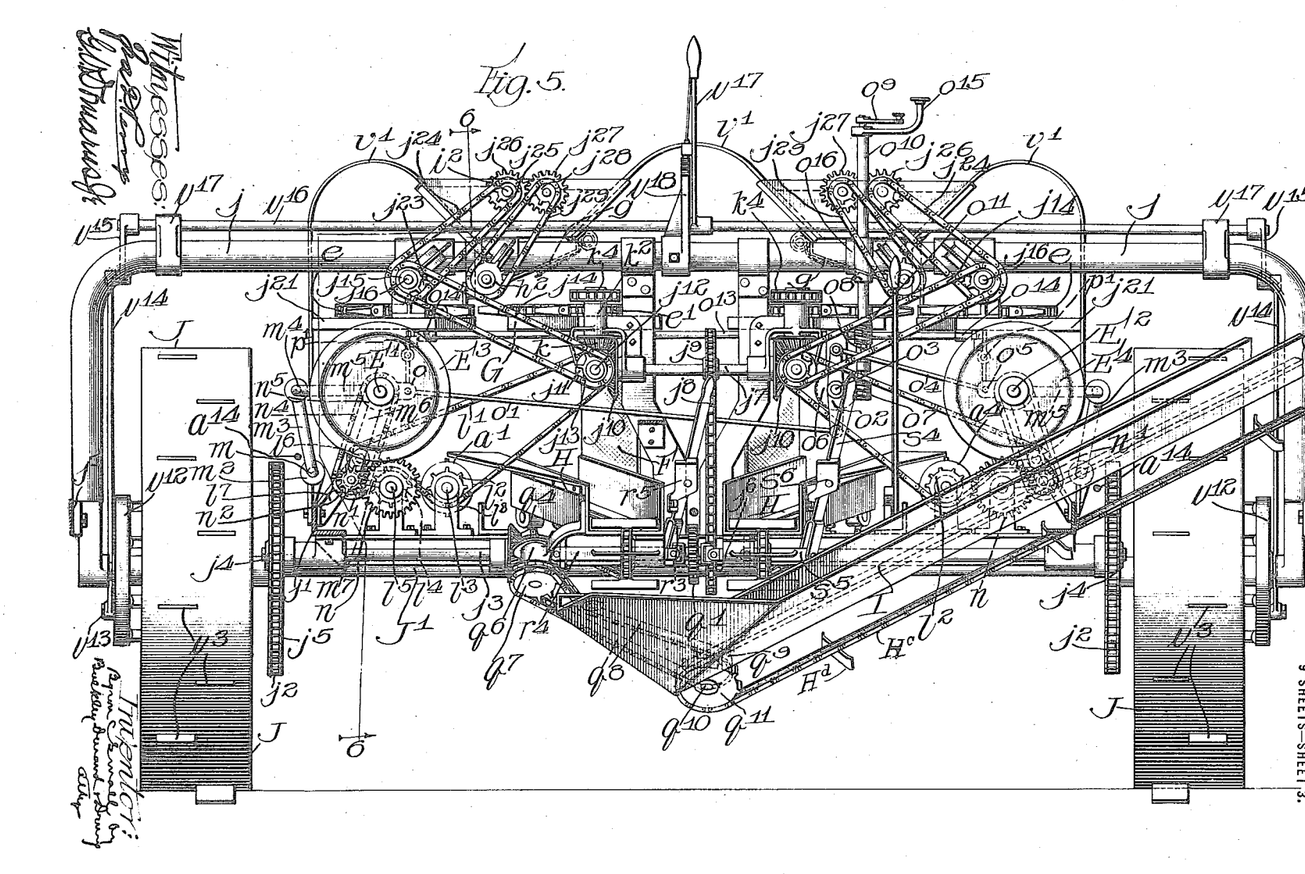

Referring to Fig. 5, it will be seen that mounted upon the wheels J of the machine is the yoke-shaped frame $j$ preferably composed of pipe. Fastened to the pipe $j$ is the angle-iron frame $j^1$, and inclined toward the front of the machine. Carried on the front end of the frame or angle-iron $j^1$ (best shown in Fig. 2) are the feed rolls $a$ and $a^3$. Mounted in the tapering end $a^2$ of the feed roll $a$ is a stationary conical member $a^5$ provided with a projecting pin or bearing $a^6$ upon which the feed roll revolves. Preferably integral with the member $a^5$ is a lug $a^7$ extending back so as to come in line with the pin $a^6$, and pivotally connected thereto is the rod $a^8$ mounted in the sliding supporting frame $a^9$ and having interposed between the frame $a^9$ and the rod $a^8$ the spring $a^{10}$, which acts as a cushion or elastic member for the feed roll.

Figures 1, 2, 3:
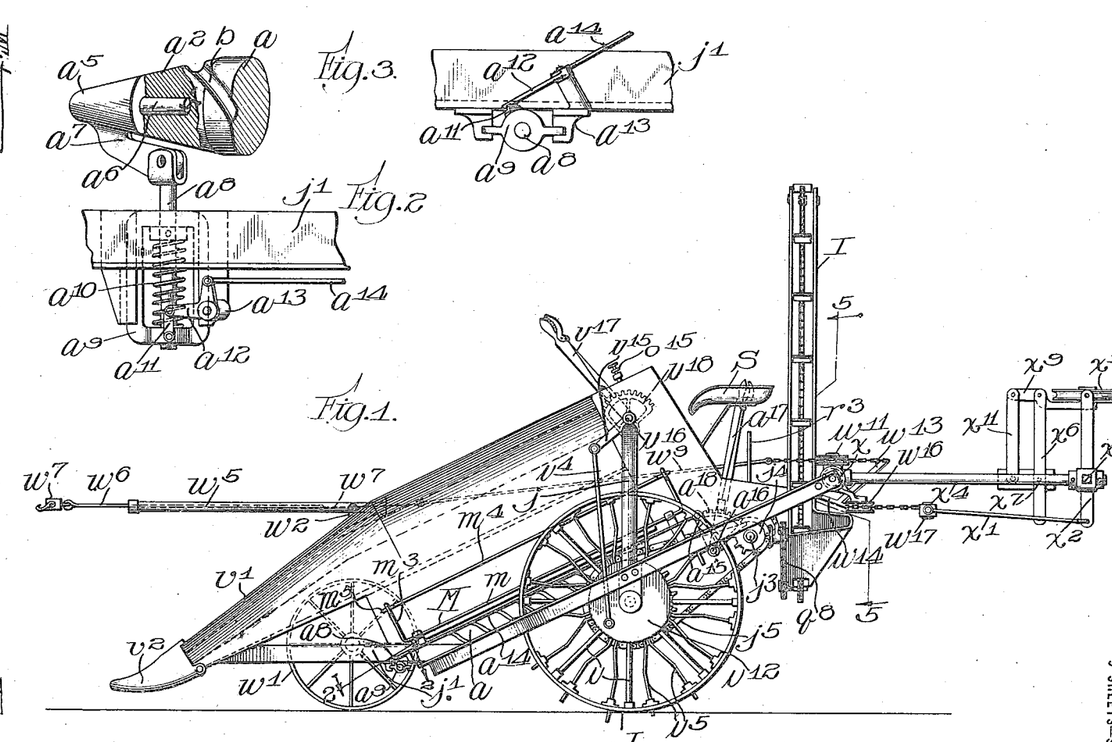
Figure 1 is a side elevation illustrating the general arrangement of mechanism embodying the invention.
Fig. 2 is an enlarged plan section on the line 2—2 of Fig. 1, looking in the direction indicated by the arrows, illustrating one of the feed rollers and the manner in which it is suspended from the frame.
Fig. 3 is an elevation of a portion of Fig. 2.

Secured to the frame $a^9$ is the link $a^{11}$ which connects with the bell-crank lever $a^{12}$ which is mounted on the casting or frame $a^{76}$ carried on the angle-iron frame $j^1$. Secured to the other end of the bell-crank lever $a^{12}$ is the rod $a^{14}$ which runs to the rear of the machine, as best shown in Figs. 1 and 8, and is connected to an arm $a^{15}$ fastened to the transverse shaft $a^{16}$. Fastened to the shaft $a^{16}$ and within easy reach of the operator is the operating lever $a^{17}$, which is locked in position by the toothed segment $a^{18}$. It will be seen that the operation of the lever $a^{17}$ rocks the shaft $a^{16}$ and also rocks the arm $a^{15}$, which pulls on the rod $a^{14}$, and through the medium of the bell-crank lever $a^{12}$ and link $a^{11}$ carries the feed roll $a$ in and out, and adjusts its tension to the other roll. Secured to the hub or sleeve $u^2$ of the wheels J are the sprocket wheels $j^2$. Mounted on the rear of the frame $j^1$ is a shaft $j^3$ which runs transversely of the machine. Secured to the shaft $j^5$ by means of ordinary ratchet clutches are the sprocket wheels $j^4$ which are driven by the chain $j^5$ from the sprocket $j^2$, as shown in Figs. 1 and 5, allowing the shaft to turn even though one wheel J were standing still, as when turning.

Figure 7:
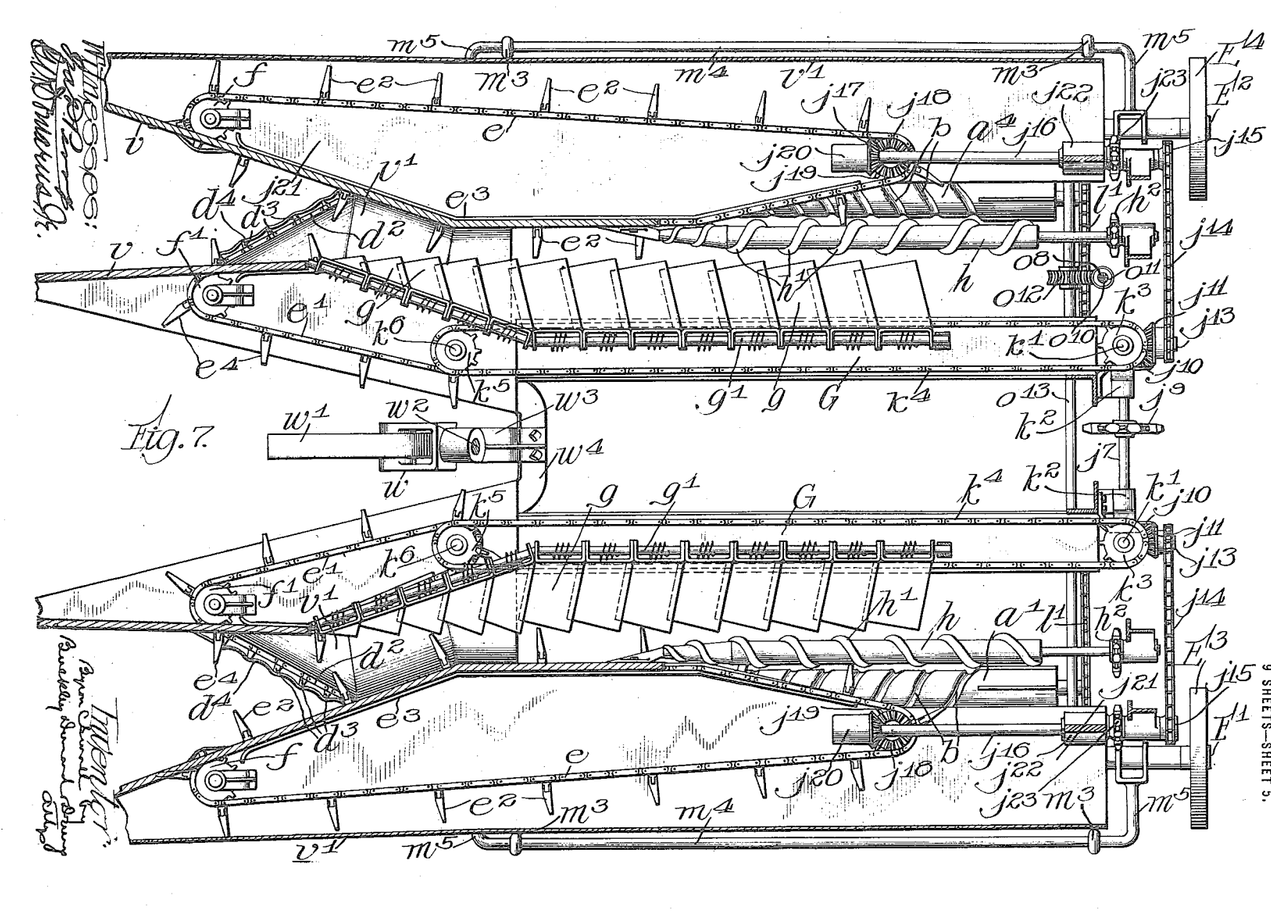
Fig. 7 is a sectional view on line 7—7 of Fig. 6, looking in the direction indicated by the arrows, and illustrates the corn stalk feed chains and driving mechanism for a two-row corn picker.

Referring to Figs. 5, 7 and 8: Mounted on shaft $j^3$ and located in the center, is the sprocket wheel $j^6$ which drives a counter shaft $j^7$ situated somewhat above and to the front of $j^3$, through the medium of the sprocket chain $j^8$ and the sprocket wheel $j^9$ on the shaft $j^7$. Fastened to the outer end of the shaft $j^7$, as shown in Fig. 5, are the bevel gears $j^{10}$ which mesh with the bevel gears $j^{11}$ in the horizontal shaft $j^{12}$. Secured to the outer end of the shaft $j^{12}$ is the sprocket wheel $j^{13}$, which transmits motion to the chain $j^{14}$, to the sprocket $j^{15}$ and on the shaft $j^{16}$. Securely mounted on the shaft $j^{16}$ at its forward end is the bevel gear $j^{17}$, which in turn meshes with the bevel gear $j^{18}$ which is secured to the sprocket wheel $j^{19}$ engaging the feed chain $e$. The shaft $j^{19}$ is mounted at its forward end in the bearing $j^{20}$ which is secured to the running board or guide $j^{21}$ for the feed chain $e$. The shaft $j^{16}$ is carried at its outer end in the bearing $j^{22}$ mounted upon the pipe frame $j$. Secured to the shaft also provide improved means of adjusting the beater or knocker bars. These and other novel features of my machine are clearly set forth in the foregoing specification.

I claim:

1. In a corn husking machine, the combination of toothed feed chain mechanism, a pair of feed rollers having spiral grooves mounted back of said toothed feed chain mechanism and adapted to engage the stalks of the material to be operated upon, and ear removing mechanism located between said feed rollers and the feed chain mechanism and adapted to remove the ears from the stalks.

2. In a corn husking machine, the combination of toothed feed chain mechanism, roller mechanism mounted back of said toothed feed chain mechanism and adapted to engage the stalks of material to be operated upon, ear removing mechanism located between the roller mechanism and the feed chain mechanism and adapted to remove the ears from the stalks, and supplemental feed rollers mounted adjacent to said gathering mechanism and adapted to receive the stalks therefrom and to carry the same rearwardly.

3. In a corn husking machine, the combination of toothed feed chain mechanism, roller mechanism mounted back of said toothed feed chain mechanism and adapted to engage the stalks of material to be operated upon, ear removing mechanism located between the roller mechanism and the feed chain mechanism and adapted to remove the ears from the stalks, and withdrawing rollers located above said feed rollers adapted to draw upwardly broken tops of stalks.

4. In a corn husking machine, the combination of toothed feed chain mechanism, roller mechanism mounted back of said toothed feed chain mechanism and adapted to engage the stalks of material to be operated upon, ear removing mechanism located between the roller mechanism and the feed chain mechanism and adapted to remove the ears from the stalks, supplemental feed rollers mounted adjacent to said gathering mechanism and adapted to receive the stalks therefrom and to carry the same rearwardly, and withdrawing rollers located above said feed rollers adapted to draw upwardly broken tops of stalks.

5. In a corn husking machine, the combination of toothed feed chain mechanism, a pair of feed rollers having spiral grooves mounted back of said toothed feed chain mechanism and adapted to engage the stalks of the material to be operated upon, and a rotary beater located between said feed rollers and the feed chain mechanism and adapted to remove the ears from the stalks.

6. In a corn husking machine, forwardly and downwardly inclined feed rollers, feed chains extending forwardly from the lower end of said feed rollers, said feed chains being inclined at a smaller angle to the horizontal than are said feed rollers, gathering chains extending from the forward end of said feed chains and extending rearwardly and upwardly and substantially parallel to said feed rollers, and ear removing mechanism mounted between said feed rollers and said gathering chains.

7. In a corn husking machine, forwardly and downwardly inclined feed rollers, feed chains extending forwardly from the lower end of said feed rollers, said feed chains being inclined at a smaller angle to the horizontal than are said feed rollers, gathering chains extending from the forward end of said feed chains and extending rearwardly and upwardly and substantially parallel to said feed rollers, and a rotary beater mounted between said feed rollers and said gathering chains.

8. In a corn husking machine, forwardly and downwardly inclined feed rollers, feed chains extending forwardly from the lower end of said feed rollers, said feed chains being inclined at a smaller angle to the horizontal than are said feed rollers, gathering chains extending from the forward end of said feed chains and extending rearwardly and upwardly and substantially parallel to said feed rollers, ear removing mechanism mounted between said feed rollers and said gathering chains, and withdrawing rollers mounted above said ear removing mechanism adapted to draw upwardly broken tops of stalks.

9. In a corn husking machine, forwardly and downwardly inclined feed rollers, feed chains extending rearwardly from the lower end of said feed rollers, said feed chains being inclined at a smaller angle to the horizontal than are said feed rollers, gathering chains extending from the forward end of said feed chains and extending rearwardly and upwardly and substantially parallel to said feed rollers, ear removing mechanism mounted between said feed rollers and said gathering chains, and auxiliary feed rollers mounted above said ear removing mechanism for receiving the stalks from said gathering chains and feeding the same rearwardly.

10. In a corn husking machine, the combination of a frame, feed rollers, a pair of diverging sprocket chains adapted to travel in front of said rollers, mechanism for driving said rollers and chains, lugs formed on said chains, and a flexible belt fastened to said lugs and adapted to hold and let go the stalks.

11. In a corn husking machine, the combination of a frame, gathering mechanism, ear-removing mechanism, downwardly exthus preventing the wheel from slipping or skidding, and retain its natural amount of driving power. When the blades leave the ground, they are withdrawn so as not to project or emerge beyond the circumference of the wheel, due to the concentric portion of the cam slot. The disk $u^{12}$ is stationary except when operated by the operator, as when the machine is running over stones or streets, and the blades must be withdrawn at the bottom of the wheel or as soon as they are entering the ground.

Pivotally connected at $u^{13}$ to the disk $u^{12}$ is a vertical rod $u^{14}$ (see Figs. 1 to 5) connecting to the arm $u^{15}$, which is securely fastened to a shaft $u^{16}$ running to the other wheel. The shaft $u^{16}$ is held in bearings $u^{17}$ at either end of the machine, which are carried upon the stationary pipe frame $j$. Secured to the shaft $u^{16}$ and preferably located at the center, is an operating lever $u^{17}$ which is held in position by engaging the toothed segment $u^{18}$ mounted on the stationary pipe frame $j$. It will be seen that if the shaft $u^{16}$ is rotated, the arm $u^{15}$ is raised, thereby pulling on the rod $u^{14}$, which in turn revolves the disk $u^{12}$, which causes the cam slot to be shifted farther away from the point that the blades or shields enter the ground.

Figure 4:
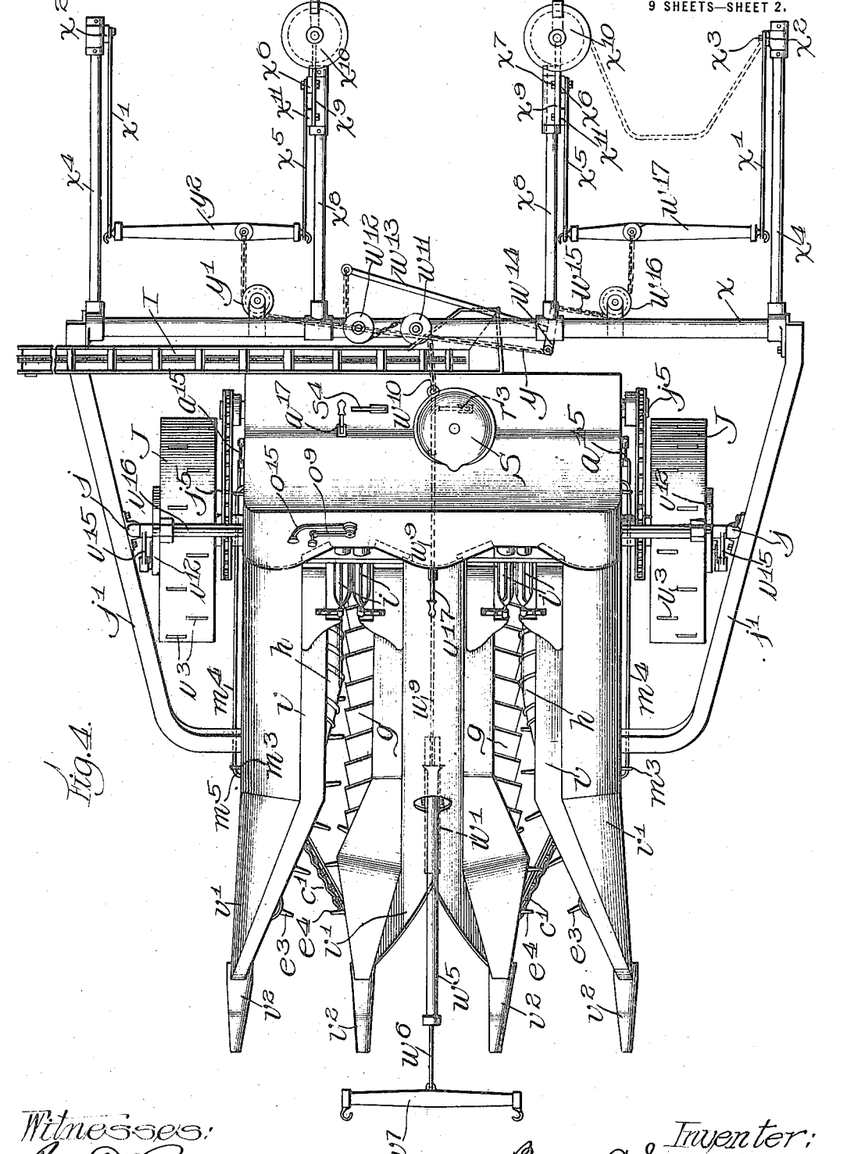
Fig. 4 is a plan view of Fig. 1.

Referring to Figs. 1, 4 and 14, it will be seen that the corn stalk, the lower end of which is held in the feed rollers $a$ and $a^1$ and away from the beater bar E, is bent or forced inwardly. This is necessary so that the corn stalk cannot come in contact with the beater bar and be broken off. A little below the upper rollers $i$ are outwardly and inwardly inclined boards or shields $v$ which prevent the corn stalk from becoming entangled in any of the operating mechanism. Fastened to the boards $v$ are the sheet metal coverings or protectors $v^1$ extending outwardly and around the beater bars E. In Fig. 4 it will be seen that these shields or protectors $v^1$ are so arranged as to direct a row of corn stalks into their proper place and position relative to the feeding mechanism. It will also be noticed that the front end of the protectors $v^1$ which taper toward the ground at the entering end are provided with protecting shoes $v^2$ on each side of a row of corn, and prevent the stalks from becoming entangled and guides them toward the proper openings formed by the protectors $v^1$.

Carrying the front end of the machine and mounted on the yoke $w$ is the guide and steering wheel $w^1$. The yoke $w$ has an upwardly extending shank or post $w^2$ adapted to turn or swivel in the bearings $w^3$ which is supported on the downwardly extending frame $w^4$. The upper end of the shank $w^2$ has pivotally mounted upon it the horizontal tube or pipe $w^5$ through which passes the rod $w^6$. Fastened to the front end of the rod $w^6$ is a swingle-tree $w^7$. Connecting to the rear end of the rod $w^6$ is fastened a short link chain $w^8$ which is fastened to the rearwardly extending rod $w^9$ (see Figs. 4 to 6). Secured to the rear end of the rod $w^9$ is a link chain $w^{10}$ which passes over an idler $w^{11}$ across to an idler $w^{12}$, then still farther back to one end of an arm $w^{13}$. Fastened to the other end of the arm $w^{13}$ is an arm $w^{14}$ at right angles to it, one end of which extends back and fastens to the chain $w^{15}$. The chain $w^{15}$ located at the left of the machine extends outwardly and passes over the idler or sheave $w^{16}$, then back, and connects to the swingle-tree $w^{17}$. The idlers $w^{11}$, $w^{12}$ and $w^{16}$ are mounted upon the pipe or frame $x$ extending across to either side and rigidly mounted upon the main frame $j^1$. Pivoted to the outer end of the swingle-tree $w^{17}$ is a slightly inclined rod $x^1$ extending back and connecting to the lower end of a vertical push-lever $x^2$. The lever $x^2$ is pivotally connected at $x^3$ to the horizontal arm or push-bar $x^4$, which is rigidly mounted on the pipe or frame $x$. Fastened to the upper end of the push-lever $x^2$ and above the pivot point $x^3$ is one end of the shoulder strap of an ordinary harness of a horse, as shown in dotted lines in Fig. 4. Fastened to the other end of the swingle-tree and opposite to the rod $x^1$ is a similar rod $x^5$ pivotally connected to the lower end of a vertical push-lever $x^6$. The lever $x^6$ is pivotally connected at $x^7$ to the horizontal arm or push-bar $x^8$, which is rigidly mounted on the frame $x$.

Fastened to the upper end of the push-lever $x^6$ and pivoted to it, is a horizontal lever $x^9$, one end of which carries a sheave or pulley $x^{10}$ to which the other end of the shoulder strap is secured. Directly in front of the push-lever $x^6$ and pivotally connected to the lever $x^9$ and the arm $x^8$ is a similar lever $x^{11}$, its function being such that the sheave $x^{10}$ always maintains a horizontal position when the horse is pushing. Connected to the other end of the short arm $w^{14}$ is a chain $y$ which passes over the sheave $y^1$ and then is fastened to the swingle-tree $y^2$. The swingle-tree $y^2$ connects to similar push-levers and connections, as illustrated on the other side and designated by like reference numerals.

The front horse pulls a quarter of the load of the machine, and serves to guide it as well. The three horses behind the machine push the remaining three quarters of the load. By means of the various equalizing devices shown in Figs. 1 and 4 the load is always equally distributed among the four horses.

By the use of my improved device, I am enabled to adjust the front ends of the rollers so as to better take in the stalks, and I $j^{16}$ and close to the bearing $j^{22}$ is a sprocket wheel $j^{23}$ which communicates motion through the chain $j^{24}$ to the sprocket wheel $j^{25}$ mounted on the shaft $i^2$ of the short feed roll $i$. Mounted on the shaft $i^2$ is the gear $j^{26}$ meshing with the gear $j^{27}$ of the other feed roller $i$. Fastened to the gear $j^{27}$ is the sprocket $j^{28}$ which in turn communicates motion to the sprocket wheel $h^2$ on the shaft of the corrugated roll $h$ through the medium of the chain $j^{29}$. The bevel gear $k$ is fastened to the vertical stud shaft $k^1$ carried in the bearing $k^2$ secured to the angle-iron supports extending from the frame $j^1$, and meshes with the bevel gear $j^{10}$. Fastened to the upper end of the shaft $k^1$ is a sprocket wheel $k^3$ (best shown in Fig. 7), which drives the chain $k^4$ extending to the front of the machine, and engaging the sprocket wheel $k^5$ mounted on the shaft $k^6$ which drives the sprocket wheel engaging the short feed chain $e^1$.

Referring now to Figs. 5 and 6: Mounted on the shaft $j^{12}$ is a sprocket wheel $l$ which drives the chain $l^1$, which in turn passes under the sprocket wheel $l^2$ mounted on the shaft $l^3$ of the lower feed roller $a^1$, then over the sprocket $l^4$ mounted on the shaft $l^5$ of the outer feed roller $a$, then over an idler $l^6$ mounted in a bracket $l^7$ supported on the angle-iron frame $j^1$. It will thus be seen that the feed rollers $a$ and $a^1$ are driven toward each other so as to force the stalks downward. The feed roller shafts $l^3$ and $l^5$ are journaled in bearings $l^8$ at their rear ends, and are supported on the cross angle-iron mounted on the frame $j^1$. The beater bars E mounted on the beater bar shaft $E^1$ are preferably constructed so that they can be adjusted vertically or horizontally, so as to regulate the force and height of beater bars for different heights of corn. Mounted on the angle-iron frame $j^1$ is the yoke or bail M, as shown in Figs. 1 and 5, comprising a long rod or body portion $m$ adapted to pivot in the bearings $m^2$ at each end, which are secured to the frame $j^1$. At the outward ends of the rods $m$ are upturned arms $m^3$ upon which is pivoted the bail or yoke $m^4$ having horizontally inward projecting arms $m^5$ which support the beater bar shaft $E^1$ at the front and rear ends.

Figure 13:
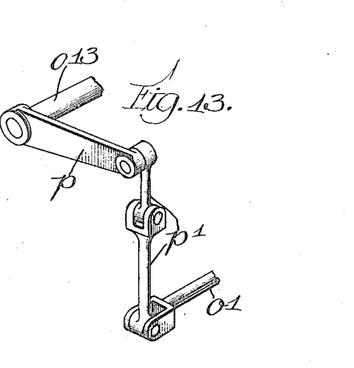
Fig. 13 is a perspective detail view of the beater adjusting mechanism.

Pivotally connected to the beater bar shaft $E^1$ is the downwardly extending link $m^6$ which is connected at its lower end to the forked link $m^7$ which is hung or pivoted about the shaft $l^5$ of the outer feed roller $a$. Fastened to the rear end of the feed roller shaft $l^5$ is a gear $n$ meshing with the gear $n^1$ mounted on the outer end of the swinging link $m^7$. Alongside of the gear $n^1$, and preferably integral therewith, is the sprocket wheel $n^2$ which engages the chain $n^4$ which drives the sprocket wheel $n^5$, securely fastened to the beater bar shaft $E^1$. It will be seen that by the medium of said mechanism motion is imparted to the beater bars E, and by the medium of the link connections the beater bars may be adjusted in either direction. In order to adjust the beater bars E inward and outward, the beater bar shaft has pivotally connected to it the ears or lugs $o$ to which is connected the rod $o^1$ running across the back of the machine and connecting at its inward end to the vertical arm $o^2$ located at the center and pivoted at its center upon the stud shaft $o^3$. The upper extending portion of the arm $o^2$ has pivotally connected to it the rod $o^4$ which connects the ears or lugs $o^5$ of the shaft $E^3$ of the beater bar E located at the right side of the machine. Securely mounted upon the shaft $o^3$ (see Fig. 5), is a worm wheel $o^6$ meshing with the worm $o^7$ mounted upon the vertical shaft $o^8$, which has secured at its upper end an operating handle $o^9$ adapted to be locked in any suitable manner. Surrounding the vertical shaft $o^8$ is the hollow shaft or pipe $o^{10}$ mounted in bearings $o^{16}$ carried upon the yoke pipe frame $j$. Secured to the lower end of the hollow shaft $o^{10}$ is the worm $o^{1D}$ which meshes with the worm wheel $o^{12}$ (see Figs. 5 and 7). Mounted on the horizontal shaft $o^{13}$, which extends across the rear of the machine, and journaled in the bearings $o^{14}$ carried on the running boards $j^{21}$, and at the upper end of the hollow shaft $o^{10}$, is rigidly connected the operating handle $o^{15}$. Fastened to the outer ends of the shaft $o^{13}$ (see Figs. 5, 6 and 13), are the arms $p$ which have pivotally connected to them the downwardly extending arms $p^1$ which connect with the ears or lugs $o$ and $o^5$ respectively which are connected to the beater bar shafts $E^1$ and $E^2$. It will be seen that if the handle $o^{15}$ is rotated it turns the hollow shaft $o^{10}$ but not the solid shaft $o^8$. This revolves the worm $o^{11}$, which in turn revolves the worm wheel $o^{12}$, thus rotating the shaft $o^{13}$ and swinging the arm $p$ up or down, which in turn raises or lowers the beater bar E and also revolves the worm wheel $o^6$, thus causing the beater bar to approach the center of the machine when raised and to recede from it when lowered, thus causing it to constantly follow the line of the inclined corn stalks. Again, if the handle $o^9$ is rotated, it turns the shaft $o^8$, which revolves the worm wheel $o^7$, which in turn revolves the worm wheel $o^6$, thus causing the lower and upper end of the arm $o^2$ to swing in or out, and in turn moving the beater bar E horizontally through the rods $o^1$ and $o^4$. Mounted on the beater bar shafts $E^1$ and $E^2$ are fly-wheels $E^3$ and $E^4$ to maintain the momentum of the shafts when the beater bar is knocking off the ears of corn.

Referring to Figs. 5, 6 and 8: Mounted on the center shaft $j^3$ is the gear $q$ engaging the gear $q^1$ connected to the universal joints $q^2$ which in turn are connected to the shaft $q^3$ driving the conveyers H. Loosely mounted on the left-hand side of the shaft $j^3$ is a bevel gear $q^4$ engaging the bevel gear $q^5$ mounted in the bearing $q^6$ carried on the conveyer H. Preferably journaled at the outer end of the bearing $q^6$ is the sprocket wheel $q^7$ driving the chain $q^8$, which extends below and engages the sprocket wheel $q^9$ mounted upon the shaft $q^{10}$ journaled at the lower end of the conveyer box I and having a sprocket wheel $q^{11}$ engaging the conveyer chain $H^c$ carrying the feed blades $H^d$.

It will be seen that motion is hereby imparted to the delivery conveyer $H^c$ from the driving shaft $j^3$. Integral with the bevel gear $q^4$ is the serrated hub or collar $q^{12}$ adapted to engage the serrated sleeve or clutch collar $r$, which is secured to the projecting hub of the sprocket wheel $J^6$ by the ordinary spline or feather. Surrounding the shaft $j^3$ and bearing against the serrated collar $r$ is the coiled spring $r^1$ held in position by the collar $r^2$ so as to keep the serrated sleeve $r$ in engagement with the serrated hub $q^{12}$ of the gear $q^4$. The clutch collar $r$ is thrown out of engagement with the gear $q^4$ by the medium of the operating lever $r^3$ connected at its lower end to the side link $r^4$ engaging the clutch collar $r$. The operating lever $r^3$ may be locked in any suitable manner, as by a notched segment $r^5$, as shown. When the clutch sleeve $r$ is disengaged with the gear $q^4$, it will be seen that the delivery conveyer I is thrown out of operation.

Integral with the sprocket wheel $j^6$, which is loosely mounted upon the shaft $j^3$, is the serrated hub $s$ adapted to engage the serrated clutch sleeve $s^1$ fastened to the shaft by the ordinary spline or feather to allow it to move back and forth and still turn. Surrounding the shaft $j^3$ and bearing against the serrated sleeve $s^1$ is the coiled spring $s^2$ held in position by the collar $s^3$ so as to always keep the clutch sleeve in mesh with the sprocket wheel $j^6$. The clutch collar $s^1$ is thrown in and out of engagement with the sprocket wheel $j^6$ by the medium of the operating lever $s^4$. Pivoted to the lower end of the lever $s^4$ are the links $s^5$ which engage the clutch member $s^1$. The lever $s^4$ may be locked in any suitable way, as, for instance, by the notched segment $s^6$. When the clutch $s^1$ is thrown in or out of engagement with the sprocket $j^6$, it will be seen that the operation of the whole machine is stopped, as is necessary when not working, but still driving the machine to some other place. Secured to the upright angles supported on the main frame $j^1$ is mounted the seat S so that the operator may have easy and free access to the operating levers.

Figure 10:
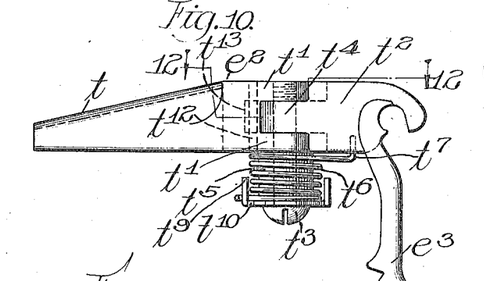
Fig. 10 is an enlarged plan detail of a portion of the feed chain, and shows one form of feed chain hook.
Figure 11:
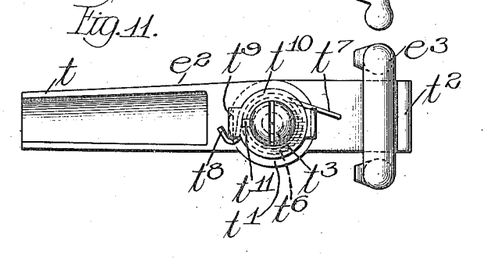
Fig. 11 is a side elevation of Fig. 10.
Figure 12:
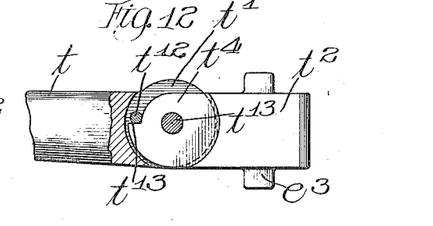
Fig. 12 is a sectional view on line 12—12 of Fig. 10, looking in the direction indicated by arrows.
Figure 15:
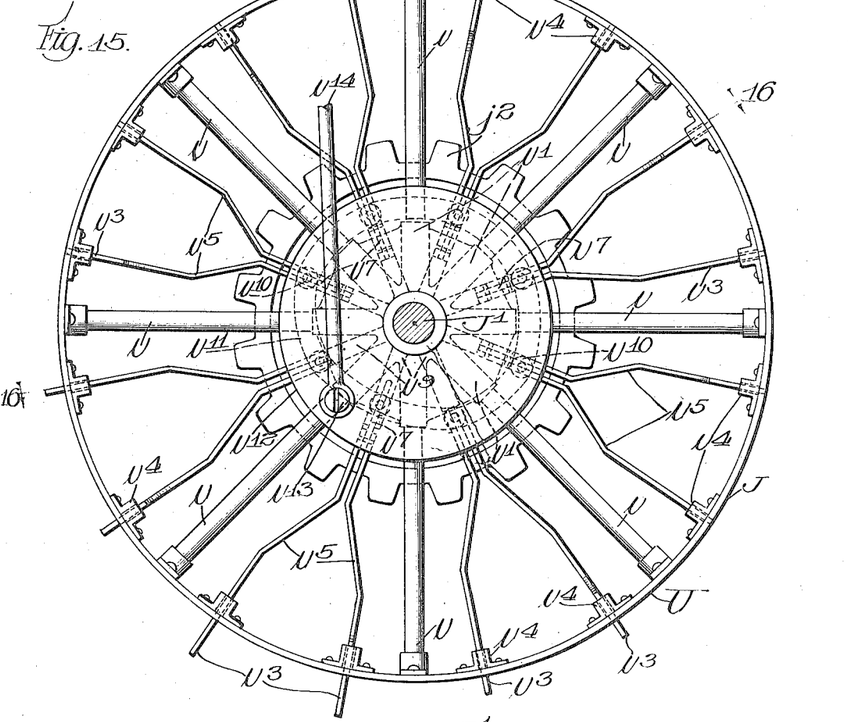
Fig. 15 is a side elevation of a type of vehicle or corn-picker wheel.
Figure 16:
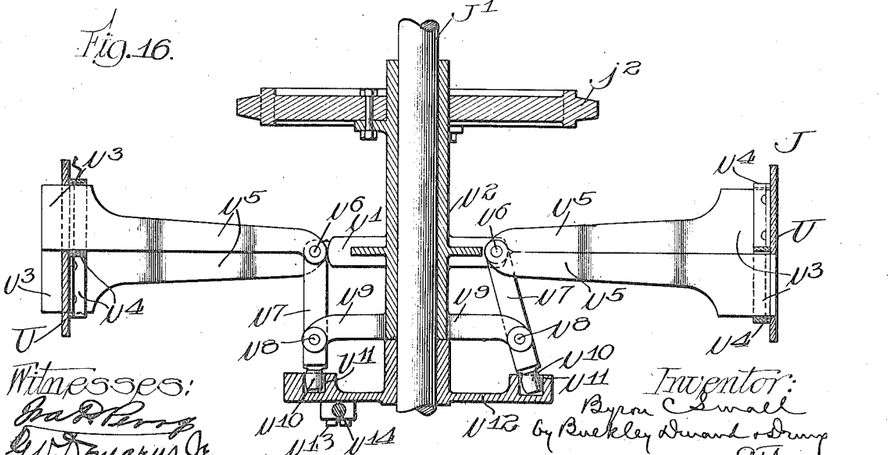
Fig. 16 is a sectional view on line 16—16 of Fig. 15.

Referring to the feed chains $e^3$, it will be seen that they are provided with hooks or fingers $e^2$ adapted to engage the corn stalks and feed them along, or prevent them from falling back. By referring to Figs. 10, 11 and 12, it will be seen that these hooks or fingers are so constructed that they are resilient, or are able to give when they engage some obstruction on the corn stalks, or the butt end of a corn stalk, in their operation of feeding the stalks downward and ahead. The hook or finger in general $e^2$ is provided with a tapering point $t$ which engages the corn stalk. The body portion of the point $t$ is provided with a couple of parallel ears $t^1$ pivotally connected to a lug $t^2$ on the chain by means of the screw or bolt $t^3$. The lug $t^2$ is provided with an ear $t^4$ which bears between the ears $t^1$. The ear $t^4$ which is adjacent to the tapering point $t$ has a depending boss $t^5$ around which is wrapped the coiled spring $t^6$ one end of which $t^7$ is fastened to the lug $t^2$. The other end $t^8$ of the coiled spring $t^5$ engages a projection $t^9$ on the washer $t^{10}$ which is securely fastened to the boss or projection $t^5$ by the toothed projection $t^{11}$. Passing through the ears $t^1$ is a pin $t^{12}$ (best seen in Fig. 12) which engages the nose or lug $t^{13}$ on the ear $t^4$, acting as a stop for the tapering feed tip $t$. It will be seen that if the tip $t$ engages any obstructions, it is depressed and immediately returned by the action of the spring $t^6$. By referring to Figs. 15 and 16, it will be seen that the wheel or driver J is preferably constructed of an outer band or rim U securely fastened to the radially spaced spokes $u$ mounted in the hubs or spider $u^1$ which is integral with the sleeve $u^2$ which is fastened to the shaft or axle $J^1$. Radially spaced and preferably located between the spokes $u$ are the blades or fins $u^3$ adapted to move in and out through the slide bearings $u^4$ secured to the rim U. The blades $u^3$ are offset or staggered transversely of the rim U and have inwardly projecting tapering arms $u^5$ which are pivotally connected at $u^6$ to the transverse and radially operating arms $u^7$. The arms $u^7$ are pivoted at $u^8$ to the arms or bearings $u^9$ which are integral with or securely fastened to the sleeve or hub $u^2$. The outward ends of the operating arms $u^7$ are provided with rollers $u^{10}$ engaging the cam slot $u^{11}$ of the disk $u^{12}$ which is loosely mounted upon the shaft $J^1$ and is stationary except when rotated by the operator.

It will be seen that when the wheel J is rotating and the disk $u^{12}$ is stationary, as the arms $u^7$ rotate about the center of the wheel and travel in the cam slot $u^{11}$, the blades or shields $u^3$ are moved in and out according to the dwell of the cam slot. When the wheels are driving or pulling the cam is so rotated that the blades will project beyond the circumference of the wheel, and enter the ground at its lowest point, tending feed rollers, all positioned within said frame, means for driving said mechanism and rollers, lower bearings for said rollers, lugs on said bearings extending rearwardly beyond the ends of the rollers, a pivot for said lugs mounted back of the end of one of said rolls, and spring means slidably mounted on the main frame for supporting said lugs in said pivot.

12. In a corn husking machine, the combination of a frame, power transmitting mechanism, gathering mechanism, ear-removing mechanism and feed rollers mounted in said frame, a bearing for the forward end of one of said rollers, said bearing comprising a pin inserted in the end of said roller, a lug for supporting said pin, said lug being pivotally supported at a point to the rear of the forward end of said roller.

13. In a corn husking machine, the combination of a frame, power transmitting mechanism and feed rollers mounted in said frame, a bearing for the forward end of one of said rollers and extending into the end of said roller, and means for pivotally supporting said bearing at a point in rear of the front end of said roller.

14. In a corn husking machine, the combination of a frame, power transmitting mechanism, gathering mechanism, ear-removing mechanism and feed rollers mounted in said frame, a bearing for the forward end of one of said rollers, said bearing comprising a pin inserted in the end of said roller, a lug for supporting said pin, said lug being pivotally supported at a point to the rear of the forward end of said roller, and means for adjusting the position of said bearing from the driver's seat.

15. In a corn husking machine, the combination of a frame, power transmitting mechanism and feed rollers mounted in said frame, a bearing for the forward end of one of said rollers and extending into the end of said roller, means for pivotally supporting said bearing at a point in rear of the front end of said roller, and means for adjusting the position of said bearing from the driver's seat.

16. In a corn husking machine, the combination of gathering mechanism adapted to engage the stalks of material to be operated upon, a rotary beater adjacent to said gathering mechanism and adapted to remove the ears from the stalks, and means for laterally adjusting said beater.

17. In a corn husking machine, the combination of gathering mechanism adapted to engage the stalks of material to be operated upon, a rotary beater adjacent to said gathering mechanism and adapted to remove the ears from the stalks, and means for vertically adjusting said beater.

18. In a corn husking machine, the combination of gathering mechanism adapted to engage the stalks of material to be operated upon, a rotary beater adjacent to said gathering mechanism and adapted to remove the ears from the stalks, and means for laterally and vertically adjusting said beater.

19. In a corn husking machine, the combination of gathering mechanism adapted to engage the stalks of material to be operated upon, a rotary beater adjacent to said gathering mechanism and adapted to remove the ears from the stalks, and means for laterally and vertically adjusting said beater, said means comprising a double yoke member mounted on the frame in which said beater bar is hung and a series of rods and links operable from the driver's seat.

20. In a corn husking machine, the combination of gathering mechanism adapted to engage the stalks of material to be operated upon, a rotary beater adjacent to said gathering mechanism and adapted to remove the ears from the stalks, and means for laterally and vertically adjusting said beater, said means comprising a double yoke member mounted on the frame in which said beater bar is hung, and a series of rods and links and worm gear adjustment operable from the driver's seat.

21. In a corn husking machine, a frame, a rotary beater bar mounted in said frame adapted to knock the ears from the stalks, feed rollers and feed chains for feeding stalks to said beater bar, mechanism for operating said beater bar and feed rollers and chains, and shield blades adjacent to said beater bar and feed chains for preventing the stalks from becoming entangled in said operating mechanism.

22. In a corn husking machine, a frame, a rotary beater bar mounted in an inclined position in said frame adapted to knock the ears from the stalks, feed rollers likewise mounted in an inclined position adjacent to said beater bar, mechanism for operating said beater bar and said feed rollers, and shield blades adjacent to said beater bar for preventing the stalks being operated upon from becoming entangled in said operating mechanism.

23. In a corn harvesting machine, a frame, feed chains mounted in said frame for feeding stalks into a position to be operated upon, a series of spring fingers carried by said chains for engaging the stalks and adapted to be depressed when striking an obstruction, and a series of stops for limiting the movement of said fingers.

24. In a two-row corn harvesting machine, a frame, a pair of beater bars mounted in opposite sides of said frame adapted to knock the ears from the stalks, gathering and feeding mechanism adjacent to each beater bar for feeding stalks to the respective beater, a pair of converging conveyers located adjacent to each beater bar for receiving the ears removed from the stalks, and a transverse conveyer located at the rear of the machine into which the first-mentioned conveyers discharge.

Signed by me at Centralia, Illinois, this 19th day of July 1909.

BYRON C. SMALL.

Witnesses:
J. W. KENDALL,
D. A. RITCHIE.